United States Patent [19]
Punis et al.

[11] 3,806,762
[45] Apr. 23, 1974

[54] APPARATUS AND METHOD FOR DIRECT LASER MODULATION

[75] Inventors: Giancarlo Punis, Sicklerville; James R. Fendley, Haddon Heights, both of N.J.

[73] Assignee: Metrologic Instruments, Inc., Bellmawr, N.J.

[22] Filed: Apr. 9, 1973

[21] Appl. No.: 348,874

[52] U.S. Cl............ 315/307, 323/4, 323/22 V, 332/7.51, 332/9 T
[51] Int. Cl............................................. G05f 1/18
[58] Field of Search...... 315/291, 307; 323/4, 22 V; 332/7.51, 9 R, 9 T, 13

[56] References Cited
UNITED STATES PATENTS

| | | |
|---|---|---|
| 3,534,245 | 10/1970 | Limberg.................................... 323/4 |
| 3,551,785 | 12/1970 | Ferrara.................................... 315/307 |
| 3,636,476 | 1/1972 | Milberger.......................... 332/13 X |

Primary Examiner—Alfred L. Brody
Attorney, Agent, or Firm—Paul & Paul

[57] ABSTRACT

A laser tube is modulated by varying the tube current between "off" and "on" current levels. A first path of the modulator circuit acts as a current source of "off" current and carries the tube current when it is modulated to the "off" state. A second path, in parallel with the first path, is adapted to be switched by the modulating signal, and when switched to a conducting state controls the tube current at a value corresponding to the desired output such that the tube is in the "on" state.

11 Claims, 4 Drawing Figures

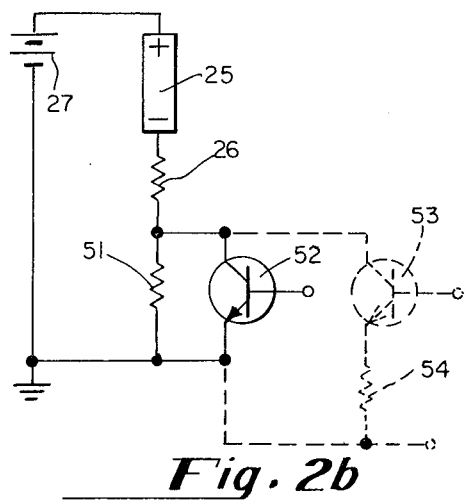
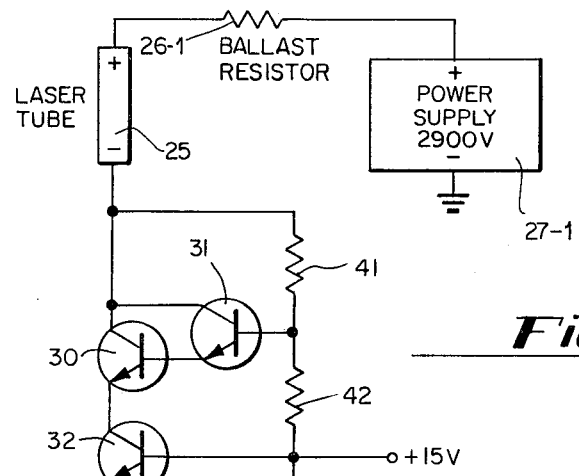
*Fig. 2b*
*Fig. 1*
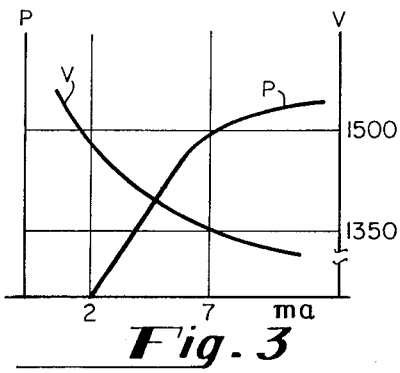
*Fig. 3*
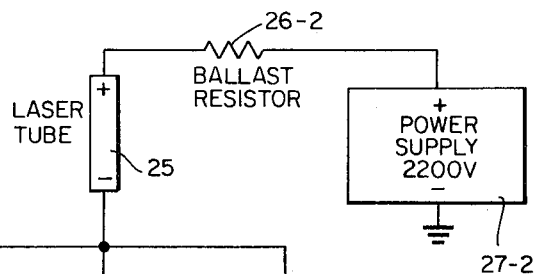
*Fig. 2a*
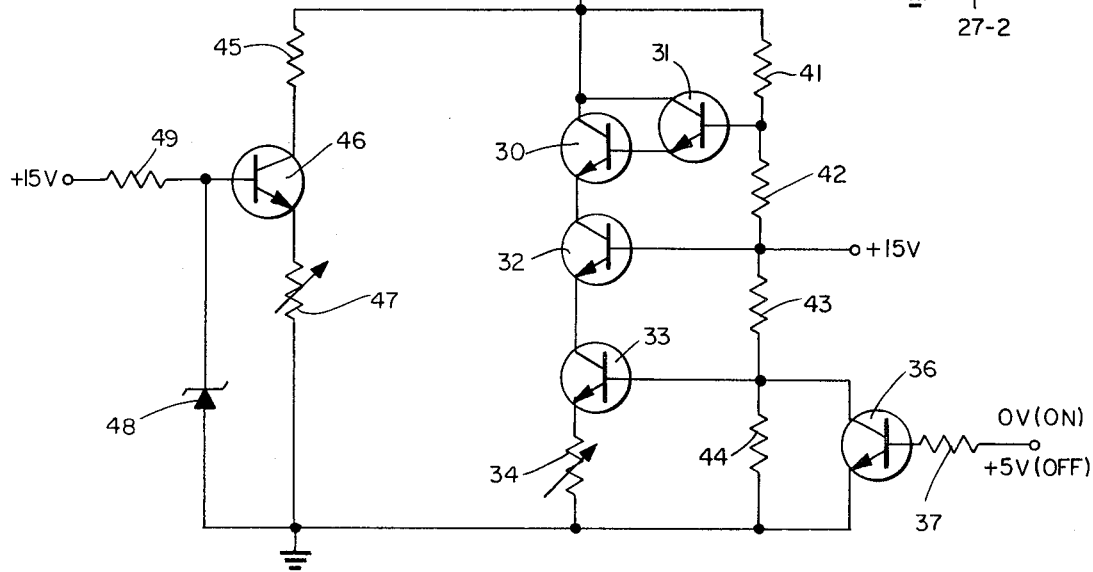

APPARATUS AND METHOD FOR DIRECT LASER MODULATION

BACKGROUND OF THE INVENTION

1. Field of the Invention

This invention lies in the field of laser modulating circuits and, more particularly, circuits for directly modulating a laser device by controlling the laser current.

2. Background of the Invention

Modulation of the output beam of a laser has for some time been viewed as a highly desirable application. As a communications medium, the laser beam inherently possesses very great capacity for information transmission, and consequently the ability to modulate the beam reliably and efficiently is of great importance. In addition to information transmission, it is desirable in other applications to have the capability of turning the laser on and off, or of varying its power output. In the prior art, the primary means which has been used for modulating the laser beam is through optical manipulation, i.e., manipulating the light beam after it has left the laser. This technique is encumbered by the obvious difficulties of requiring additional optical hardware, as well as the difficulty of coupling a high frequency modulating signal to optical modulating means.

Direct modulation of the laser tube, by varying the laser output power, overcomes a number of the difficulties of optical modulation. However, there are also problems attendant to direct modulation. For a laser tube which exhibits a negative resistance characteristic, and for which the output is power dependent, it is necessary to employ in series with a laser tube a ballast resistor of a value theoretically greater than the greatest negative resistance at which the tube is to be operated. Such a large ballast resistor in turn causes the requirement of an extremely high voltage source, with consequent large power dissipation. There is accordingly a need for a reliable method and means for direct modulation of a laser which enables reliable modulation at high information rates, and with minimum power dissipation.

SUMMARY OF THE INVENTION

It is the primary object of this invention to provide means for direct modulation of a laser tube by varying the laser current, which means permits a minimization of the required ballast resistor and power supply while enabling high frequency modulation.

Accordingly, there is provided a means and method for modulating the output power of a laser tube by varying the tube current, comprising a modulating circuit having parallel paths connected to the laser, with a first of such paths having a high effective resistance such that when the tube current flows through the first path the tube is caused to conduct a relatively low current, and the second path connected to the tube having an effective resistance which is low relative to that of the first path, whereby when the tube current passes through the second path the tube is caused to conduct a higher current, the current changes causing changes in tube output power. Means is provided for coupling a modulating signal to the modulating circuit so as to alternately cause the tube current to flow through the respective paths, thereby modulating the tube between on and off states.

BRIEF DESCRIPTION OF THE DRAWINGS

FIG. 1 is a circuit diagram of a prior art modulating circuit.

FIG. 2a is a circuit diagram of the preferred embodiment of the apparatus of this invention.

FIG. 2b is a circuit diagram of a simplified form of the embodiment shown in FIG. 2a.

FIG. 3 is a graph illustrating the variation of laser tube power and laser tube voltage drop as a function of current.

DESCRIPTION OF THE PREFERRED EMBODIMENTS

The apparatus embodiments of this invention, as illustrated in FIGS. 2a and 2b, are modulating circuits applicable to laser tubes which can be modulated by varying the tube current, which tubes further exhibit current-dependent negative resistance characteristics. Referring to FIG. 3, there are shown typical curves for a helium-neon laser operated in an enhancement mode, i.e., where power increases with increasing current. As illustrated by the curve designated P, the laser tube turns off, or ceases to transmit a light output, for laser tube current levels below approximately 2 ma. For increasing tube currents above 2 ma, the power rises approximately linearly until it reaches a knee at about 7 ma. It is thus seen that, by controlling the laser tube current, the light power output of the tube can be controlled in a corresponding manner. In the circuits described hereinbelow, when the laser is modulated to an "on" state, it operates at about 7 ma. However, in a more general sense, it is to be understood that the laser can be considered to be in an on state when it is placed within a wide range of operating output powers. Similarly, in the discussions hereinbelow, the laser is considered to be in an off state when the laser current is taken down to 2 ma. However, as a matter of use or definition, it is to be understood that off could refer to a state of operation where the power output level is reduced below any predetermined level. In addition, many laser tubes can be turned on and off by operating at higher currents where the power drops off with increasing current. Thus, if the P-I curve of FIG. 3 were extended through a greater current range, it would be seen that power would eventually drop off with increasing current. It is thus clear that for such a laser tube operating in an on condition, it can be turned off by either increasing or decreasing the current. Thus, it is emphasized that the off state is defined in terms of power output level, and not in terms of current.

Referring to the curve designated V in FIG. 3, it is shown that for increasing tube currents, the voltage drop across the laser tube drops, such that the tube is characterized by negative resistance. For the helium-neon laser, the negative resistance in the off state (2 ma) is about 110 K. When the tube is in the on state (7 ma), the negative resistance is about 30 K. These impedance figures are approximate, and it is to be understood that they will vary somewhat depending upon tube design.

The modulation circuits shown in the drawings relate to modulation of a helium-neon laser. It is to be understood that the method and apparatus of this invention are applicable generally to any laser having a power output which is a function of tube current, and which exhibits current-dependent negative impedance characteristics. For example, helium-cadmium, argon and carbon dioxide lasers also fit in this category. Such other lasers have correspondingly different characteristics, i.e., different operating currents and different ranges of negative resistance, and the method and apparatus of this invention are not limited by the illustrations of circuits useful with helium-neon lasers, which circuits are illustrative and not exclusive.

Referring now to the prior art embodiment of FIG. 1, there is shown a laser tube 25 in series with a ballast resistor 26-1 and a power supply 27-1. For a helium-neon laser, the tube negative impedance when in the off state is about 110 K, and therefore the ballast resistor should be somewhat larger than 110 K. In practice, it has been found that a ballast resistor of approximately 200 K is needed for reliable modulation of the tube between on and off states. For a ballast resistor of this order, it has been found that a power supply of about 2,900 volts is required. Also connected in series with the laser tube (shown connected to the negative terminal, or cathode) are cascoded transistors 30, 32 and 33, the emitter of transistor 33 being connected through variable resistor 34 to ground. Resistors 41, 42, 43 and 44 are connected in series between the laser cathode and ground. Transistor 31 has its collector connected to the collector of transistor 30, its emitter connected directly to the base of transistor 30, and its base connected to the node between resistors 41 and 42. Variable resistance 35 is connected between ground and the node between the emitter of transistor 32 and the collector of transistor 33. Transistor 36 is connected across resistor 44, the modulating signal being coupled through resistor 37 to the base of transistor 36.

In operation, stacked transistors 30 and 32 allow for power supply variations due to line variations. The 15 volt supply connected at the node between resistors 42 and 43 divides across resistors 43 and 44 so as to hold transistor 33 normally in an on condition, such that the laser tube current is shunted through transistor 33 and does not go through resistor 35. When a positive voltage (+5 volts) is connected to the base of transistor 36, it is turned on, thus shunting resistor 44 and eliminating the positive bias on transistor 33. This turns off transistor 33, whereby the laser tube current is shifted through resistor 35, causing the laser tube to see an effectively higher impedance, resulting in reduced laser current flow. In operation of the modulation circuit of FIG. 1, the following nominal values are employed:

| ELEMENT | VALUE |
|---------|-------|
| R26-1 | 200 K |
| R41 | 1 meg |
| R42 | 1 meg |
| R43 | 4.7 K |
| R44 | 10 K |
| R35 | 10 K variable |
| R34 | 2.5 K variable |
| R37 | 4.7 K |
| 27-1 | 2900 volts |

Referring now to FIG. 2a, there is shown an improved version of the prior art modulating circuit, which incorporates novel features which provide substantial operating advantages. In this circuit, there is added a separate path between the laser cathode and ground, comprising resistor 45 (nominally 150 K) in series with transistor 46 and variable resistor 47 (variable up to 5 K). Zener diode 48 (5 volts) is connected between ground and the base of transistor 46, and combines with resistor 49 (510 ohms) connected between the base of transistor 46 and a 15 volt source to provide an appreciably constant voltage at the base, maintaining transistor 46 in a conducting state. This path provides an effective current source of about 2 ma, being the off current of the laser. The other main path between laser tube 25 and ground is the same as for FIG. 1, with the exception that the resistor 35 is eliminated. The ballast resistor 26-2 has a nominal value of 91 K.

The circuit of FIG. 2a allows the tube to operate with an effective large ballast resistor when in the off state, and with a substantially smaller ballast resistor when in the on state. When in the off state, the path through transistors 30, 32 and 33 is opened, and the tube current is controlled by transistor 46 acting as a current source. The effective ballast resistor, i.e., the effective resistance in series with the laser tube, is approximately 91 K plus 150 K, or 241 K. When the input to transistor 36 is reduced substantially to zero, so as to turn off transistor 36, the path through transistors 30, 32 and 33 shunts the first path, and controls the tube current at about 7 ma, transistor 33 acting as an effective 7 ma current source. Under this condition, the effective ballast resistor is substantially 91 K. This arrangement, in comparison with that of FIG. 1, permits a savings in power supply voltage requirement and in power dissipation. Since the ballast resistor 26-2 need be only 91 K, the power supply 27-2 can be reduced to 2,200 volts. Thus, the large on current (7 ma) has to flow through only 91 K rather than through approximately 200 K (as in the circuit of FIG. 1), thus enabling substantially reduced power dissipation. Additionally, tests of the circuit of FIG. 2a have shown that it can be modulated at a higher frequency than that of FIG. 1.

In the use of the apparatus of this invention, the modulating signal is connected directly to the input of switching transistor 36. It is appreciated that the ease of coupling the modulating signal to the modulator is substantially increased as compared to optical coupling schemes. It is noted, however, that if it becomes necessary to float the modulator at a high voltage, it is possible to use an optical coupler between transistor 36 and the modulating source, to couple the modulator to such external modulating source.

The preferred embodiment as shown in FIG. 2a represents a circuit which includes some features which are not essential to the basic modulation method of this invention, but which are desirable in a production unit to accommodate tube-to-tube variations and AC line variations. In FIG. 2b, there is shown a simplified form of the preferred modulation circuit of this invention, stripped to its bare essentials. In this form, there are shown two parallel paths connected to ballast resistor 26, namely, fixed high resistance 51 and transistor 52. In the circuit of FIG. 2b, where the laser tube is turned off by decreasing tube current, when transistor 52 is conducting, the laser is in its on state, and when transistor 52 is not conducting, the laser is in its off state. It is to be noted that where the tube is to be turned off by increasing tube current, the roles of the parallel paths are reversed such that when transistor 52 is conducting the laser is in its off state (e.g., 15 ma), and when transistor 52 is not conducting, the laser is in its on state (e.g., 7 ma). As indicated in phantom, an additional transistor 53 (or a plurality of such transistors in parallel) with a resistor 54 connected between its emitter and ground, may be also utilized. By choosing an appropriate value of resistor 54, transistor 53 may be designed as an effective current source to provide a current flow anywhere within the power range of the tube (nominally 2 to 7 ma for the helium-neon laser). Thus, in addition to modulating strictly on and off, the tube may be modulated to produce different power levels, or simply switched (through appropriate logic circuitry not shown) to operate at different power levels, by switching on a given current source, or combination of such current sources.

The modulation circuitry as discussed above is seen to provide a reliable and efficient method of modulating the light output of a laser. By appropriate coupling of a modulating signal to the modulation circuit, the tube can be switched between an on and off state, or switched to any of a plurality of different power levels. The apparatus as disclosed permits operation of the laser at low power levels, and under reduced power dissipation circumstances. The apparatus and method of this invention are applicable to a wide variety of lasers, and it is understood that the specific values of circuit components utilized are adapted to accommodate the negative impedances and current levels for respective different laser tubes. Furthermore, it is appreciated that equivalent forms of the circuit design are within the scope of this invention.

We claim:

1. A method of modulating a laser tube which is in series with a ballast resistor and a power source, comprising alternately
   a. operatively connecting said laser tube in series with a first of two parallel paths, said first path having a first effective impedance which is greater than said ballast resistor, whereby said tube is caused to conduct a first current and to operate in a first power state; and
   b. operatively connecting said tube in series with a second path having a second effective impedance which is less than said ballast resistor, whereby said tube is caused to conduct a second current through said second path and to operate in a second state.

2. The method as described in claim 1, wherein said tube operates in an off state when caused to conduct a relatively low current, and operates in an on state when caused to conduct a relatively high current.

3. The method as described in claim 1, wherein said tube operates in an off state when caused to conduct a relatively high current, and operates in an on state when caused to conduct a relatively low current.

4. The method as described in claim 1, comprising alternating said operative connections so as to switch said tube between its on and off states in a predetermined manner to produce an information-carrying light output.

5. The method as described in claim 3, wherein said first path comprises a first current source and said second path comprises a second current source.

6. The method as described in claim 1, comprising alternately operatively connecting a respective one of a plurality of current source paths to said laser tube, each comprising a current source of a different respective value.

7. A method of modulating a laser tube having a negative resistance characteristic by varying the tube current, comprising:
   a. connecting said tube in series with a power supply and a ballast resistor, said ballast resistor having a resistance value less than the greatest negative resistance at which said tube is operated; and alternately
   b. operatively connecting said laser tube in series with a first path having a first effective impedance, whereby said tube is caused to conduct a first current and to operate in a first power state, and
   c. operatively connecting said tube in series with a second path having a second effective impedance, whereby said tube is caused to conduct a second current through said second path and to operate in a second state.

8. Laser apparatus adapted for producing a modulated laser light output, comprising:
   a. a laser tube having the characteristic of a varying output light power with varying tube current, and having a negative impedance characteristic;
   b. a power supply, connected to said laser tube;
   c. a ballast resistor of value less than the magnitude of the greatest negative impedance at which said laser tube is operated;
   d. a first circuit path connected to said tube having a first resistance of sufficient magnitude such that the combined value of said first resistance and said ballast resistor is in excess of said magnitude of greatest negative impedance;
   e. a second path connected in parallel with said first path; and
   f. coupling means, for coupling a modulating signal to said second path, for causing said second path to be alternately conducting and substantially non-conducting, whereby said tube is caused to operate alternately in an on state and an off state respectively.

9. The apparatus as described in claim 8, wherein said first path comprises a first current source and said second path comprises a second current source.

10. The apparatus as described in claim 9, wherein said second path comprises a variable current source means, for varying the laser tube current.

11. Apparatus for providing a controllable light output, comprising:
    a. light generating means having a light output which varies as a function of current and having a negative resistance characteristic, for providing a light output which can be modulated by controlling said current;
    b. power supply means connected to said light generating means for supplying said current;
    c. a first circuit path connected to said light generating means, having a high resistance in series with a conducting active device and providing a high resistance path to said current;
    d. a second circuit path connected in parallel with said first path, and having a plurality of cascoded active devices, said second path having an effective resistance which is low relative to that of said first path when said plurality of active devices are conducting; and
    e. coupling means for coupling a control signal to said second path so as to control the conductive state of said second path, whereby said current and said light output are controlled.

* * * * *